US007877551B2

(12) United States Patent
Blumrich et al.

(10) Patent No.: US 7,877,551 B2
(45) Date of Patent: Jan. 25, 2011

(54) PROGRAMMABLE PARTITIONING FOR HIGH-PERFORMANCE COHERENCE DOMAINS IN A MULTIPROCESSOR SYSTEM

(75) Inventors: Matthias A. Blumrich, Ridgefield, CT (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 11/768,532

(22) Filed: Jun. 26, 2007

(65) Prior Publication Data
US 2009/0006769 A1    Jan. 1, 2009

(51) Int. Cl.
G06F 13/00 (2006.01)
G06F 13/28 (2006.01)

(52) U.S. Cl. ............... 711/146; 711/141; 711/170; 711/173; 711/E12.026

(58) Field of Classification Search ............. 711/146
See application file for complete search history.

(56) References Cited

U.S. PATENT DOCUMENTS

| | | | |
|---|---|---|---|
| 4,777,595 A | 10/1988 | Strecker et al. | |
| 5,063,562 A | 11/1991 | Barzilai et al. | |
| 5,142,422 A | 8/1992 | Zook et al. | |
| 5,349,587 A | 9/1994 | Nadeau-Dostie et al. | |
| 5,353,412 A | 10/1994 | Douglas et al. | |
| 5,452,432 A | 9/1995 | Macachor | |
| 5,524,220 A | 6/1996 | Verma et al. | |
| 5,634,007 A | 5/1997 | Calta et al. | |
| 5,659,710 A * | 8/1997 | Sherman et al. ............. 711/146 |
| 5,708,779 A | 1/1998 | Graziano et al. | |
| 5,748,613 A | 5/1998 | Kilk et al. | |
| 5,761,464 A | 6/1998 | Hopkins | |
| 5,796,735 A | 8/1998 | Miller et al. | |
| 5,809,278 A | 9/1998 | Watanabe et al. | |
| 5,825,748 A | 10/1998 | Barkey et al. | |
| 5,890,211 A | 3/1999 | Sokolov et al. | |
| 5,917,828 A | 6/1999 | Thompson | |

(Continued)

OTHER PUBLICATIONS

"Intel 870: A Building Block for Cost-Effective, Scalable Servers", Faye Briggs, Michel et al., p. 36-47, Mar.-Apr. 2002,.*

(Continued)

*Primary Examiner*—Matt Kim
*Assistant Examiner*—Michael Alsip
(74) *Attorney, Agent, or Firm*—Scully, Scott, Murphy & Presser, P.C.; Daniel P. Morris, Esq.

(57) ABSTRACT

A multiprocessor computing system and a method of logically partitioning a multiprocessor computing system are disclosed. The multiprocessor computing system comprises a multitude of processing units, and a multitude of snoop units. Each of the processing units includes a local cache, and the snoop units are provided for supporting cache coherency in the multiprocessor system. Each of the snoop units is connected to a respective one of the processing units and to all of the other snoop units. The multiprocessor computing system further includes a partitioning system for using the snoop units to partition the multitude of processing units into a plurality of independent, memory-consistent, adjustable-size processing groups. Preferably, when the processor units are partitioned into these processing groups, the partitioning system also configures the snoop units to maintain cache coherency within each of said groups.

19 Claims, 2 Drawing Sheets

U.S. PATENT DOCUMENTS

| | | | |
|---|---|---|---|
| 6,023,732 | A | 2/2000 | Moh et al. |
| 6,061,511 | A | 5/2000 | Marantz et al. |
| 6,072,781 | A | 6/2000 | Feeney et al. |
| 6,122,715 | A | 9/2000 | Palanca et al. |
| 6,185,214 | B1 | 2/2001 | Schwartz et al. |
| 6,219,300 | B1 | 4/2001 | Tamaki |
| 6,263,397 | B1 | 7/2001 | Wu et al. |
| 6,295,571 | B1 | 9/2001 | Scardamalia et al. |
| 6,311,249 | B1 | 10/2001 | Min et al. |
| 6,324,495 | B1 | 11/2001 | Steinman |
| 6,356,106 | B1 | 3/2002 | Greeff et al. |
| 6,366,984 | B1 | 4/2002 | Carmean et al. |
| 6,442,162 | B1 | 8/2002 | O'Neill et al. |
| 6,466,227 | B1 | 10/2002 | Pfister et al. |
| 6,564,331 | B1 | 5/2003 | Joshi |
| 6,594,234 | B1 | 7/2003 | Chard et al. |
| 6,598,123 | B1 * | 7/2003 | Anderson et al. ............ 711/133 |
| 6,601,144 | B1 | 7/2003 | Arimilli et al. |
| 6,631,447 | B1 | 10/2003 | Morioka et al. |
| 6,647,428 | B1 | 11/2003 | Bannai et al. |
| 6,662,305 | B1 | 12/2003 | Salmon et al. |
| 6,735,174 | B1 | 5/2004 | Hefty et al. |
| 6,775,693 | B1 | 8/2004 | Adams |
| 6,799,232 | B1 | 9/2004 | Wang |
| 6,874,054 | B2 | 3/2005 | Clayton et al. |
| 6,880,028 | B2 | 4/2005 | Kurth |
| 6,889,266 | B1 | 5/2005 | Stadler |
| 6,894,978 | B1 | 5/2005 | Hashimoto |
| 6,954,887 | B2 | 10/2005 | Wang et al. |
| 6,986,026 | B2 | 1/2006 | Roth et al. |
| 7,007,123 | B2 | 2/2006 | Golla et al. |
| 7,058,826 | B2 | 6/2006 | Fung |
| 7,065,594 | B2 | 6/2006 | Ripy et al. |
| 7,143,219 | B1 | 11/2006 | Chaudhari et al. |
| 7,191,373 | B2 | 3/2007 | Wang et al. |
| 7,239,565 | B2 | 7/2007 | Liu |
| 7,280,477 | B2 | 10/2007 | Jeffries et al. |
| 7,298,746 | B1 | 11/2007 | De La Iglesia et al. |
| 7,363,629 | B2 | 4/2008 | Springer et al. |
| 7,373,420 | B1 | 5/2008 | Lyon |
| 7,401,245 | B2 | 7/2008 | Fischer et al. |
| 7,454,640 | B1 | 11/2008 | Wong |
| 7,454,641 | B2 | 11/2008 | Connor et al. |
| 7,461,236 | B1 | 12/2008 | Wentzlaff |
| 7,463,529 | B2 | 12/2008 | Matsubara |
| 7,502,474 | B2 | 3/2009 | Kaniz et al. |
| 7,539,845 | B1 | 5/2009 | Wentzlaff et al. |
| 7,613,971 | B2 | 11/2009 | Asaka |
| 7,620,791 | B1 | 11/2009 | Wentzlaff et al. |
| 7,698,581 | B2 | 4/2010 | Oh |
| 2001/0055323 | A1 | 12/2001 | Rowett et al. |
| 2002/0078420 | A1 | 6/2002 | Roth et al. |
| 2002/0087801 | A1 | 7/2002 | Bogin et al. |
| 2002/0100020 | A1 | 7/2002 | Hunter et al. |
| 2002/0129086 | A1 | 9/2002 | Garcia-Luna Aceves et al. |
| 2002/0138801 | A1 | 9/2002 | Wang et al. |
| 2002/0156979 | A1 | 10/2002 | Rodriguez |
| 2002/0184159 | A1 | 12/2002 | Tadayon et al. |
| 2003/0007457 | A1 | 1/2003 | Farrell et al. |
| 2003/0028749 | A1 | 2/2003 | Ishikawa et al. |
| 2003/0050714 | A1 | 3/2003 | Tymchenko |
| 2003/0050954 | A1 | 3/2003 | Tayyar et al. |
| 2003/0074616 | A1 | 4/2003 | Dorsey |
| 2003/0105799 | A1 | 6/2003 | Khan et al. |
| 2003/0163649 | A1 * | 8/2003 | Kapur et al. ................ 711/146 |
| 2003/0177335 | A1 | 9/2003 | Luick |
| 2003/0188053 | A1 | 10/2003 | Tsai |
| 2003/0235202 | A1 | 12/2003 | Van Der Zee et al. |
| 2004/0003184 | A1 * | 1/2004 | Safranek et al. ............. 711/146 |
| 2004/0019730 | A1 | 1/2004 | Walker et al. |
| 2004/0024925 | A1 | 2/2004 | Cypher et al. |
| 2004/0073780 | A1 | 4/2004 | Roth et al. |
| 2004/0103218 | A1 | 5/2004 | Blumrich et al. |
| 2004/0210694 | A1 | 10/2004 | Shenderovich |
| 2004/0243739 | A1 | 12/2004 | Spencer |
| 2005/0007986 | A1 | 1/2005 | Malladi et al. |
| 2005/0053057 | A1 | 3/2005 | Deneroff et al. |
| 2005/0076163 | A1 | 4/2005 | Malalur |
| 2005/0160238 | A1 | 7/2005 | Steely et al. |
| 2005/0216613 | A1 | 9/2005 | Ganapathy et al. |
| 2005/0251613 | A1 | 11/2005 | Kissell |
| 2005/0270886 | A1 | 12/2005 | Takashima |
| 2005/0273564 | A1 | 12/2005 | Lakshmanamurthy et al. |
| 2006/0050737 | A1 | 3/2006 | Hsu |
| 2006/0080513 | A1 | 4/2006 | Beukema et al. |
| 2006/0206635 | A1 | 9/2006 | Alexander et al. |
| 2006/0248367 | A1 | 11/2006 | Fischer et al. |
| 2007/0055832 | A1 | 3/2007 | Beat |
| 2007/0133536 | A1 | 6/2007 | Kim et al. |
| 2007/0168803 | A1 | 7/2007 | Wang et al. |
| 2007/0174529 | A1 | 7/2007 | Rodriguez et al. |
| 2007/0195774 | A1 | 8/2007 | Sherman et al. |
| 2008/0147987 | A1 | 6/2008 | Cantin et al. |

OTHER PUBLICATIONS

Definition of "mechanism", Oxford English Dictionary, http://dictionary.oed.com/cgi/entry/00304337?query_type=word&queryword=mechanism&first=1&max_to_show=10&sort_type=alpha&result_place=2&search_id=y2atEIGc-11603&hilite+00304337.

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n. 6, p. 49-58, Jun. 1990.

Michel, Dubois, Christoph Scheurich, Faye A. Briggs, Synchronization, Coherence, and Event Ordering in Multiprocessors, Computer, v.21 n. 2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

Pande, et al., Performance Evaluation and Design Trade-Offs for Network-On-Chip Interconnect Architectures, 2005, IEEE, pp. 1025-1040.

* cited by examiner

PROGRAMMABLE PARTITIONING FOR HIGH-PERFORMANCE COHERENCE DOMAINS IN A MULTIPROCESSOR SYSTEM

GOVERNMENT RIGHTS

This invention was made with Government support under Contract No.: B554331, awarded by Department of Energy. The Government has certain rights to this invention.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. Pat. No. 7,694,035, for "DMA SHARED BYTE COUNTERS IN A PARALLEL COMPUTER"; U.S. Pat. No. 7,788,334, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. Pat. No. 7,827,391, for "METHOD AND APPARATUS FOR SINGLE-STEPPING COHERENCE EVENTS IN A MULTIPROCESSOR SYSTEM UNDER SOFTWARE CONTROL"; U.S. Pat. No. 7,669,012, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. Pat. No. 7,802,025, for "DMA ENGINE FOR REPEATING COMMUNICATION PATTERNS"; U.S. Pat. No. 7,680,971, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. Pat. No. 7,701,846, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. Pat. No. 7,793,038, for "A SYSTEM AND METHOD FOR PROGRAMMABLE BANK SELECTION FOR BANKED MEMORY SUBSYSTEMS"; U.S. Pat. No. 7,761,687, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. Pat. No. 7,797,503, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. Pat. No. 7,738,443, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

1. Field of the Invention

This invention generally relates to multiprocessor computer systems, and more specifically, to coherent, shared memory multiprocessor computer systems. Even more specifically, the preferred embodiment of the invention relates to a method and system for flexible and programmable coherence traffic partitioning for multiprocessor systems.

2. Background Art

To achieve high performance computing, multiple individual processors have been interconnected to form multiprocessor computer systems capable of parallel processing. Multiple processors can be placed on a single chip, or several chips—each containing one or several processors—interconnected into a multiprocessor computer system.

Processors in a multiprocessor computer system use private cache memories because of their short access time and to reduce the number of memory requests to the main memory. However, managing caches in a multiprocessor system is complex. Multiple private caches introduce the multi-cache coherency problem (or stale data problem) due to multiple copies of main memory data that can concurrently exist in the caches of the multiprocessor system.

Multi-cache coherency can be maintained in a multiprocessor computer system by use of an appropriate coherence protocol. The protocols that maintain the coherence between multiple processors generally rely on coherence events sent between caches. For example, MESI is a common coherence protocol where every hardware cache line can be in one of four states: modified (M), exclusive (E), shared (S), or invalid (I). Line states are changed by memory references issued by the processors.

In a coherent multiprocessor system, a memory reference issued by one processor can affect the caches of other processors. For example, when a processor stores to a line, the coherence mechanism must insure that eventually all caches either have the new data or have no data for that line at all. This generally involves a good deal of inter-processor communication for testing the state of the line in the various caches and changing the state, if necessary. Commonly, such interprocessor communication is conducted by passing packets containing coherence protocol actions and responses between processors.

One group of cache coherence protocols is referred to as snooping. In a snooping approach, each cache keeps the sharing status of a block of physical memory locally. The caches are usually on a shared memory bus, and all cache controllers snoop (monitor) the bus to determine whether they have a copy of a requested data block.

A common hardware coherence protocol is based on invalidations. In this protocol, any number of caches can contain a read-only line, but these copies must be destroyed when any processor stores to the line. To do this, the cache corresponding to the storing processor sends invalidations to all the other caches before storing the new data into the line. If the caches are write-through, then the store also goes to main memory where all caches can see the new data. Otherwise a more complicated protocol is required when some other cache reads the line with the new data.

As multiprocessor systems scale both in size and speed, bus-based interconnects between processors become a limiting factor. A common replacement for a bus is a point-to-point network, where every processor has a dedicated communication channel to every other processor.

Also, as multiprocessor systems scale, it is desirable to share the capability of the system between multiple applications running simultaneously. In some cases, this can be done by running separate processes with a shared operating system. But in other cases, this sharing results in security concerns. In these cases, it is desirable to run multiple applications on dedicated processors, each with their own operating systems. What is needed is a mechanism for partitioning the processors into separate groups such that they can operate independently from one another. Ideally, the size of the groups and their number should be adjustable based on the needs of the applications. The coherence mechanism should partition along with the processors so that every group of processors remains consistent and operates just like a smaller version of the whole multiprocessor.

SUMMARY OF THE INVENTION

An object of this invention is to provide a method and system for partitioning the processors of a multiprocessor system into groups such that the groups can operate independently from one another.

Another object of the present invention is to partition the processors of a multiprocessor system into groups, where the sizes and number of the groups are adjustable.

A further object of the invention is to partition the processors of a multiprocessor system having a cache coherence mechanism into groups, and to partition the cache coherency mechanism along with the processors so that every group of processors remains consistent and operates just like a smaller version of the whole multiprocessor system.

Another object of this invention is to use a cache coherency mechanism to partition the processors of a multiprocessor system into logical groups.

These and other objectives are attained with a multiprocessor computing system and a method of logically partitioning a multiprocessor computing system. The multiprocessor computing system comprises a multitude of processing units and a multitude of snoop units. Each of the processing units includes a local cache, and the snoop units are provided for supporting cache coherency in the multiprocessor system. Each of the snoop units is connected to a respective one of the processing units and to all of the other snoop units. The multiprocessor computing system further includes a partitioning system for using the snoop units to partition the multitude of processing units into a plurality of independent, adjustable-size, memory-consistent processing groups. Preferably, when the processor units are partitioned into these processing groups, the partitioning system configures the snoop units to maintain cache coherency within each of said groups.

In the operation of the preferred multiprocessor computing system, data packets specifying memory references are sent from the processing units to the snoop units, and each of the snoop units includes a packet processor for processing said data packets. Also, the partitioning system includes a multitude of control mechanisms, and each of said control mechanisms is associated with one of the snoop units. Each of the control mechanisms blocks the associated snoop unit from processing selected ones of said data packets; and in particular, blocks the associated snoop unit from processing data packets coming from processing units outside the processing group to which the snoop unit belongs. In this way, the control mechanisms effect the desired logical partitioning of the processing units.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
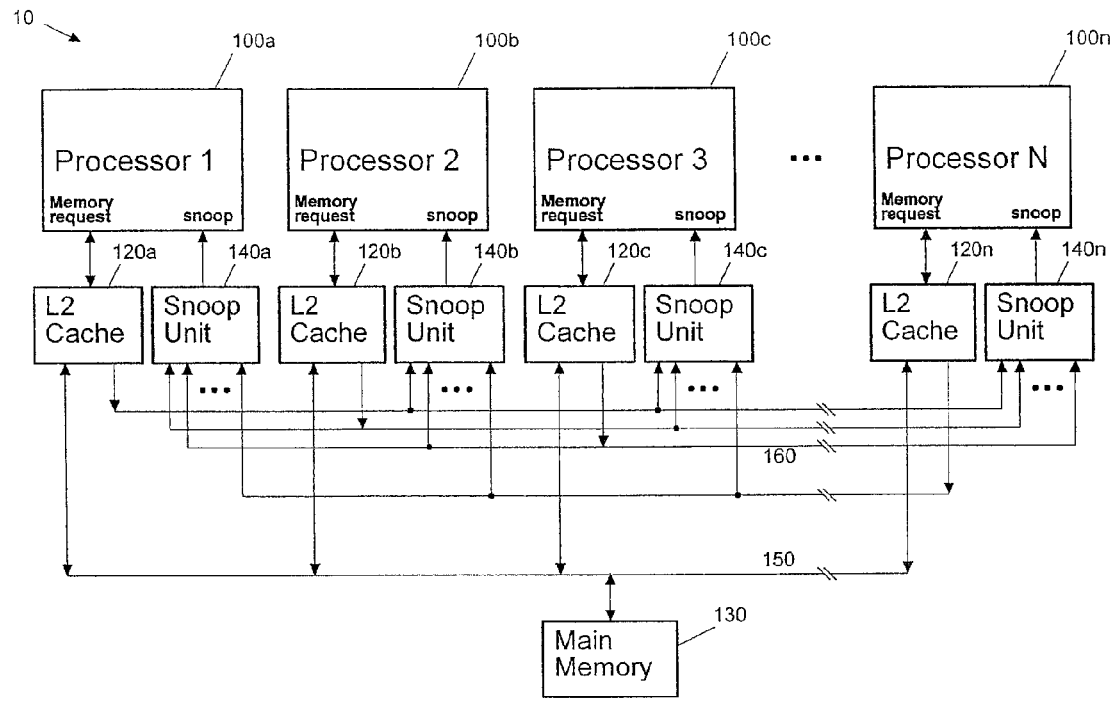
FIG. 1 depicts a base multiprocessor system that uses snooping to maintain cache coherency.

Referring now to drawings, and more particularly to FIG. 1, there is shown the overall base architecture of the multiprocessor system 10 with the use of a snooping approach for cache coherency. In the preferred embodiment, the multiprocessor system is composed of N processors 100a, ... 100n (or CPUs) with their local L1 data and instruction caches, and their associated L2 caches 120a, ..., 120n. The main memory 130 is shared and can be implemented on-chip or off-chip. In an alternative embodiment, instead of main memory, a shared L3 with access to main memory can be used. In the preferred embodiment, the processor cores 100a, ..., 100n are identical. In an alternative embodiment, heterogeneous cores in a single multiprocessor system are used without departing from the scope of this invention. The processor cores 100a, ..., 100n are interconnected by a system local bus 150.

To implement the memory coherence protocol, a snoop unit 140a, ..., 140n is provided for each respective processor core 100a, ..., 100n in the multiprocessor system 10. For transferring coherence requests, the preferred embodiment does not use the system bus 150, as typically found in prior art systems, but rather implements a point-to-point interconnection 160 whereby each processor's associated snoop unit is directly connected with each snoop unit associated with every other processor in the system. Thus, coherence requests are decoupled from all other memory requests transferred via the system local bus, reducing the congestion of the bus, which is often a system bottleneck. All coherence requests to a single processor are forwarded to the snoop unit 140a, ..., 140n. The snoop units may optionally include one or more snoop filters that process incoming snoop requests and present only a fraction of all requests to the processors.

Figure 2:
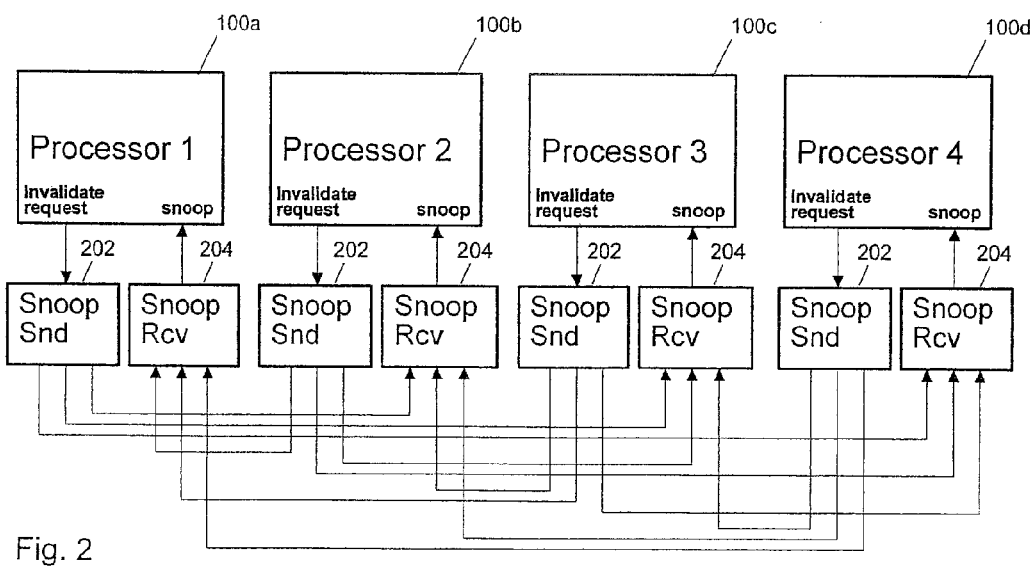
FIG. 2 shows the point-to-point coherence connections used to implement an invalidation coherence protocol in a 4-way multiprocessor.

FIG. 2 shows a four-processor version of system 10 and also shows in more detail the coherence connections of those four processors, where each processor contains a cache memory. The multiprocessor system supports an invalidation coherence protocol. On every store, each processor produces invalidate requests, which are sent to all of the other processors by the Snoop Snd logic, represented at 202. At each processor, the Snoop Rcv logic, represented at 204, receives the invalidate requests and is responsible for serializing these requests into the snoop input of the processor. Within the processor, each of these messages causes a single cache line to be invalidated. The links between Snoop Snd and Snoop Rcv units are all point-to-point and may be operated using any suitable request/response or token flow-control protocol. The direction of the arrows shown in FIG. 2 is the direction of the invalidation requests.

Figure 3:
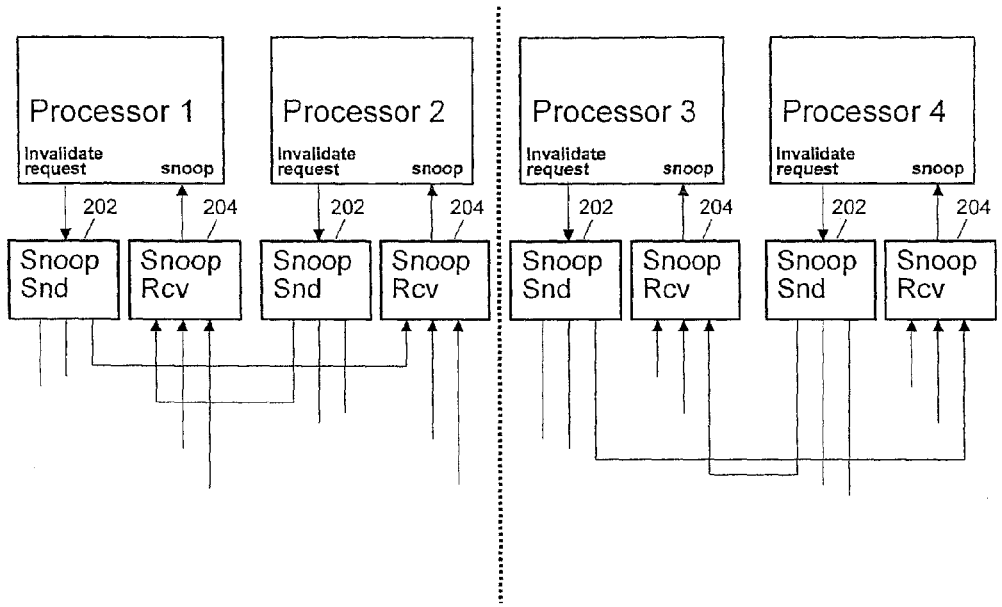
FIG. 3 shows the multiprocessor of FIG. 1 partitioned into two 2-way multiprocessors, each in its own coherence domain.

FIG. 3 shows a partitioning of the processors of FIG. 2 such that Processor 1 and Processor 2 are in one coherence domain, and Processor 3 and Processor 4 are in a second coherence domain. The processors within a coherence domain maintain memory consistency as described previously herein. In FIG. 3, the dashed line between processors 2 and 3 represents the partitioning, and all point-to-point coherence connections that cross the partition have been removed because coherence between the two coherence domains is unnecessary. The only connections remaining allow processors within coherence domains to invalidate one another.

In order to achieve the partition of FIG. 3, it is not necessary to physically remove the coherence connections between the domains. There needs to be a mechanism for removing them virtually. The preferred method for doing so is to leave the Snoop Snd units 202 unchanged, and add a feature to the Snoop Rcv units 204 to support the coherence link protocol while not performing any coherence actions when appropriate.

The preferred embodiment of this invention uses a token flow-control protocol, which works as follows. The receiving end of the link can buffer some number of packets, and there is a token for every buffer slot. Initially, the sending end of the link holds all the tokens. The sender consumes a token for every packet that it sends. The receiver buffers the packets and then returns a token to the sender every time it has completed processing a packet and freed a packet buffer. An advantage of the token-based flow control protocol is that the link can remain completely busy as long as the tokens are returned at the same rate that packets are sent, and as long as there are enough tokens to last until the first token is returned (i.e., to cover the cumulative time of the packet transfer, the packet processing, and the token return).

Tokens are typically implemented as counters at the sending and receiving ends of a link. Data packets implicitly carry a token from the sender to the receiver, and there are various ways to return tokens from the receiver to the sender. One way is to send a special, dedicated packet with the token. Another way is to piggyback the token on a data packet going in the opposite direction, if the link is full-duplex.

Figure 4:
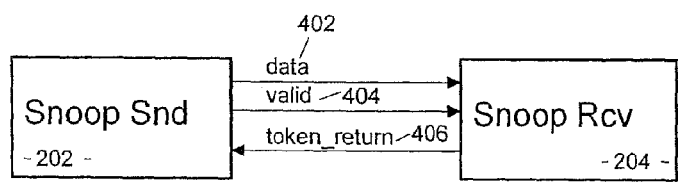
FIG. 4 shows the signals used to implement the transport layer of a point-to-point coherence connection.
Figure 5:
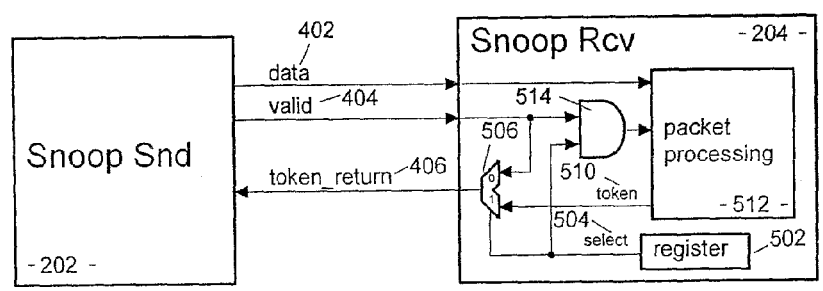
FIG. 5 shows the preferred logic used to implement the invention.

FIG. 4 shows a synchronous coherence connection of the preferred embodiment. The Snoop Snd unit 202 sends a packet by placing the data packet, represented at 402, on the data signal line and asserting the valid signal, represented at 404, for one cycle. The Snoop Rcv unit 204 returns a token to the Snoop Snd unit by asserting the token_return signal, represented at 406, for one cycle. In order to sever the point-to-point links crossing a partition, as shown in FIG. 3, it is sufficient for the receiving end of a link to satisfy the requirements of the flow-control protocol without actually acting on the contents of the packets received. That is, a link can be virtually cut by simply returning a token for every packet sent and discarding the packet at the receiver. FIG. 5 shows how this is done.

Normally, the register 502 driving the select signal 504 is programmed with the value 1 so that the multiplexer 506 selects the token signal 510 coming from the packet processing logic 512 as the token_return signal 406, and allows the valid signal 404 to go through the AND gate 514 to the packet processing logic 512. In order to virtually "cut" the link, the register 502 is programmed with the value 0 so that the multiplexer 506 selects the valid signal 404 as the token_return signal 406, and the valid signal is blocked by the AND gate 514 from affecting the packet processing logic 512. Effectively, the valid signal 404 is looped-back as the token_return signal 406 and the packet processing logic 512 assumes that no packets are ever received.

The invention shown in FIG. 5 can be applied to the receiving end of every coherence connection in the multiprocessor system. For example, the multiprocessor system of FIG. 2 would apply the invention at the receiving end of all three point-to-point links coming into each of the Snoop Rcv units 204. By programming the registers 502 within the Snoop Rcv units 204, links could be individually severed without affecting the behavior of the Snoop Snd units 202. Because there is a separate coherence connection from each Snoop Snd unit to each remote Snoop Rcv unit, it can be seen that any grouping of processors into coherent domains is possible simply by virtually severing all links that exit a domain.

Those skilled in the art will recognize that a completely partitionable multiprocessor system can be formed by combining this invention with a physically-partitionable memory. For example, every memory request could carry a unique "coherence domain identifier" that could be used to determine which physical memory partition it would be directed to.

Those skilled in the art will recognize that this invention works equally well when the Snoop Rcv units 204 contain one or more snoop filters for eliminating unnecessary coherence requests, as this functionality is orthogonal to the operation of the coherence protocol. The preferred embodiment of the invention works so long as a token is returned for every coherence request, regardless of whether the request is presented to the processor or not.

As will be readily apparent to those skilled in the art, the present invention or aspects of the invention can be realized in hardware, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out methods described herein. Alternatively, a specific use computer, containing specialized hardware for carrying out one or more of the functional tasks of the invention, could be utilized.

The present invention or aspects of the invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A multiprocessor computing system comprising:
   a multitude of processing units, each of the processing units including a local cache;
   a multitude of snoop units for supporting cache coherency in the multiprocessor system, each of the snoop units being connected to and associated with a respective one of the processing units and connected to all of the other snoop units; and
   a partitioning system for using the snoop units to partition the multitude of processing units and the multitude of snoop units into a plurality of separate, independent, memory-consistent, adjustable-size processing groups and to maintain cache coherency within each of said processing groups, wherein each of said processing groups includes one or more of the processing units and each of the snoop units associated with said one or more of the processing units; and wherein:
   in use, data packets resulting from memory access requests are sent from the processing units to the snoop units, and each of the snoop units includes
   a packet processor for processing said data packets, and a programmable register identifying selected ones of the processing units; and
   each snoop unit processes only the data packets from said selected ones of the processing units, and said each snoop unit is blocked from processing data packets coming from the processing units outside the processing group to which said each snoop unit belongs to effect partitioning of the multitude of processing units into said separate groups.

2. A multiprocessor computing system according to claim 1, wherein the partitioning system configures the snoop units into said groups while maintaining said cache coherency within each of said groups.

3. A multiprocessor computing system according to claim 2, wherein:
   the partitioning system includes a multitude of control mechanisms, and each of said control mechanisms is associated with one of the snoop units; and
   each of the control mechanisms blocks the associated snoop units from processing selected ones of said data packets.

4. A multiprocessor computing system according to claim 3, wherein, when one of said snoop units is in a defined one of said plurality of groups, the control mechanism associated with said one of the snoop units blocks said associated snoop unit from processing data packets from processing units outside said defined one of said plurality of groups.

5. A multiprocessor computing system according to claim 4, wherein the control mechanism associated with said one of the snoop units does not block said one of the snoop units from processing data packets coming from processing units within said defined one of said plurality of groups.

6. A multiprocessor computing system according to claim 5, wherein some of the data packets are accompanied by data valid signals, and said each of the control mechanisms further includes a gate for selectively passing data valid signals to the packet processor of the associated snoop unit.

7. A multiprocessor computing system according to claim 6, in each of the control mechanisms, control values from the register of the control mechanism are applied to the gate of the control mechanism to determine which data valid signals are passed to the packet processor of the associated snoop unit.

8. A multiprocessor computing system according to claim 7, wherein the data valid signals are sent from each of the snoop units to all of the other snoop units, and when each snoop unit receives selected ones of the data valid signals, said selected ones of the data valid signals are returned to the snoop units that sent said selected ones of the data valid signals.

9. A multiprocessor computing system according to claim 8, wherein each of the snoop units includes one or more snoop filters to process data packets and present a reduced number of data packets to the processor connected to said each snoop unit.

10. A method for logically partitioning a multiprocessor computing system, said multiprocessor computing system comprising a multitude of processing units, each of the processing units including a local cache, and the multiprocessor computing system further comprising a multitude of snoop units for supporting cache coherency in the multiprocessor computing system, each of the snoop units being connected to and associated with a respective one of the processing units and connected to all of the other snoop units of the multiprocessor computing system, the method comprising the steps of:
   transmitting data packets resulting from memory access requests from the processing units to the snoop units; and
   using the snoop units to partition the multitude of processing units and the multitude of snoop units into a plurality of separate independent, memory-consistent, adjustable-size processing groups and to maintain cache coherency within each of said processing groups, wherein each of said processing groups includes one or more of the processing units and each of the snoop units associated with said one or more of the processing units; and wherein:
   each of the data packets includes a packet processor for processing the data packets, and a programmable register identifying selected ones of the processing units; and
   each snoop unit processes only the snoop units from said selected ones of the processing units, and said each snoop unit is blocked from processing data packets coming from the processing units outside the processing group to which said each snoop unit belongs to effect partitioning of the multitude of processing units into said separate processing groups.

11. A method according to claim 10, wherein the using step includes the step of configuring the snoop units into said groups to maintain said cache coherency within each of said groups.

12. A method according to claim 11, wherein:
   the using step includes the step of blocking the packet processors of selected ones of the snoop units from processing selected ones of said data packets.

13. A method according to claim 12, wherein the blocking step includes the step of blocking snoop units within a defined one of the groups from processing data packets coming from processing units outside said defined one of said plurality of groups.

14. A method according to claim 13, wherein the using step includes the step of not blocking any of the snoop units within said defined one of said plurality of groups from processing data packets from processing units within said defined one of said plurality of groups.

15. A method according to claim 14, wherein each of the snoop units includes programmable registers for identifying which data packets are to be processed by the snoop unit and which data packets are to be blocked from being processed by the snoop unit.

16. A method according to claim 14, wherein each of the snoop units includes one or more snoop filters to process data packets and present a reduced number of data packets to the processors.

17. A program storage device readable by machine, tangibly embodying a program of instructions executable by the machine to perform method steps for logically partitioning a multiprocessor computing systems, said multiprocessor computing system comprising a multitude of processing units, each of the processing units including a local cache, and the multiprocessor computing system further comprising a multitude of snoop units for supporting cache coherency in the multiprocessor computing system, each of the snoop units being connected to and associated with a respective one of the processing units and connected to all of the other snoop units of the multiprocessor computing system, said method steps comprising the steps of:

transmitting data packets from the processor units to the snoop units; and using the snoop units to partition the multitude of processor units into a plurality of separate, independent, memory-coherent adjustable-size processing groups and to maintain cache coherency within each of said processing groups, wherein each of said processing groups includes one or more of the processing units and each of the snoop units associated with said one or more of the processing units; and wherein:

each of the snoop units includes a packet processor for processing the data packets, and a programmable register identifying selected ones of the processing units; and each snoop unit processes only the data packets from said selected ones of the processing units, and said each snoop unit is blocked from processing data packets coming from the processing units outside the processing group to which said each snoop unit belongs to effect partitioning of the multitude of processing units into said separate processing groups.

18. A program storage device according to claim 17, wherein the using step includes the step of configuring the snoop units into said groups to maintain said cache coherency within each of said groups.

19. A program storage device according to claim 17, wherein the using step includes the steps of:

blocking snoop units within a defined one of the groups from processing data packets from processing units outside said defined one of said plurality of groups; and not blocking any of the snoop units within said defined one of said plurality of groups from processing data packets from processing units within said defined one of said plurality of groups.

* * * * *